C. O. REYNOLDS.
BAKING PAN.
APPLICATION FILED APR. 4, 1917.
1,257,119.
Patented Feb. 19, 1918.
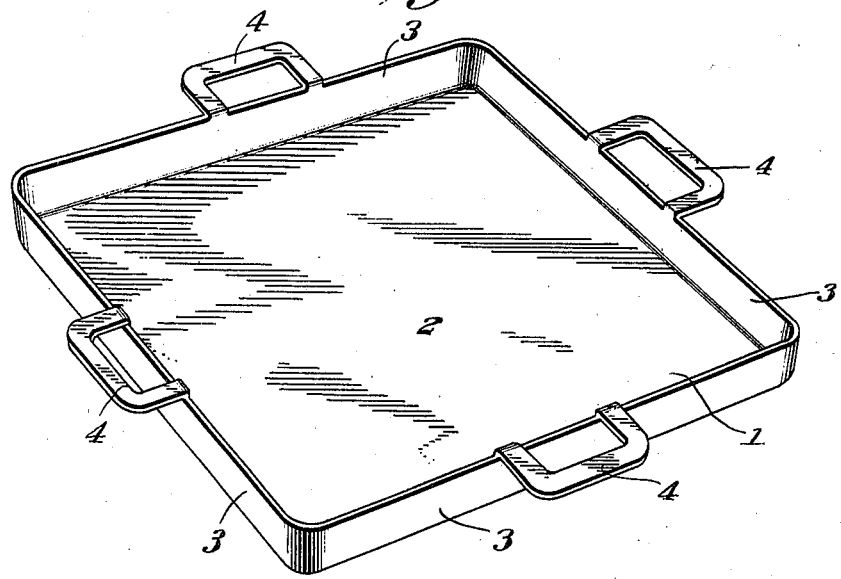
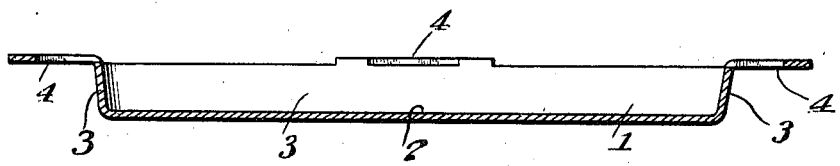
WITNESSES
INVENTOR
C. O. Reynolds,
BY Victor J. Evans
ATTORNEY

UNITED STATES PATENT OFFICE.

CHARLES O. REYNOLDS, OF HUNTINGTON, WEST VIRGINIA.

BAKING-PAN.

1,257,119.

Specification of Letters Patent. Patented Feb. 19, 1918.

Application filed April 4, 1917. Serial No. 159,692.

*To all whom it may concern:*

Be it known that I, CHARLES O. REYNOLDS, a citizen of the United States, residing at Huntington, in the county of Cabell and State of West Virginia, have invented new and useful Improvements in Baking-Pans, of which the following is a specification.

This invention relates to baking pans and has for its primary object the provision of a pan especially designed for baking biscuits and provided on each side with a handle to prevent the body of the pan being brought into close contact with the walls of the oven.

Another object of the invention is to provide a shallow biscuit baking pan which may be formed from a single piece of sheet metal by one operation of a stamping and forming die.

The invention also aims to generally improve biscuit baking pans to render them more practical, efficient and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a perspective view of the baking pan, and

Fig. 2 is a vertical sectional view through the pan.

Referring in detail to the drawings by numerals, 1 designates as an entirety, a baking pan having a bottom 2, side walls 3 and handles 4. The pan is preferably constructed from thin cold drawn steel and may be formed in one operation from a thin plate of metal by a stamping and forming die. The handles 4 are formed integral with the body of the pan and project outwardly in a horizontal plane from the upper edges of the pan walls. One handle is provided at the central portion of each of the side walls and these handles serve to prevent the body of the pan being pushed into close engagement with the walls of the oven which would cause an uneven distribution of heat and be likely to burn the contents of the pan. By holding the body of the pan from close engagement with the oven walls a free circulation of air around all sides of the pan is permitted which produces a uniform heating of the pan contents and causes perfect baking action to take place. The corners of the blank from which the pan is formed are slightly rounded as shown to prevent a tearing or splitting of the metal when stamped to form the completed article.

I preferably make these pans twelve inches square and one inch deep. Of course, other sizes may be made but I have found that a shallow pan gives better results than one of greater depth.

A pan formed of a single piece of metal in the fashion described has no seams in which dirt and other accumulations may collect and is therefore very sanitary. When made from cold drawn steel, the pan is very rigid and will last for a very long time.

From the foregoing description taken in connection with the accompanying drawings it will be apparent that I have provided a very practical and durable one piece baking pan which can not be placed into close contact with the walls of an oven and which is absolutely seamless.

While I have shown and described the preferred embodiments of my invention it will be clearly understood that I do not wish to be limited to this construction, but may make such changes as will fall within the scope and spirit of the invention as claimed.

What I claim is:—

As a new article of manufacture, comprising a shallow baking pan formed from a single sheet of metal comprising a bottom and side walls and the point of intersection of each of the side walls presenting rounded corners, a handle formed on the upper edge of each of said side walls, each of the handles projecting outwardly from a point medially of each of the side walls and in a horizontal plane from the upper edges of the said walls.

In testimony whereof I affix my signature.

CHARLES O. REYNOLDS.